Patented Nov. 21, 1922.

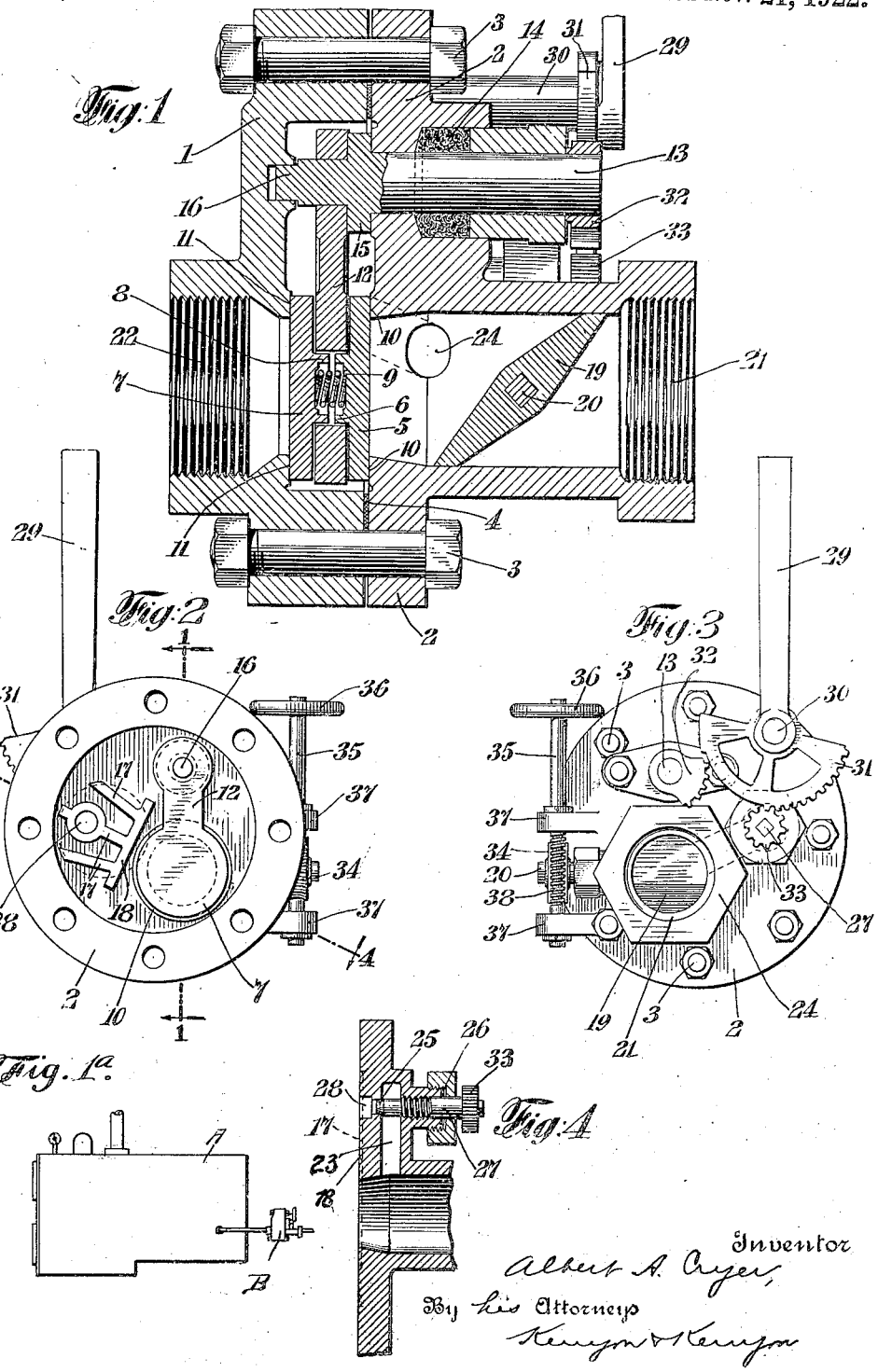

1,436,438

UNITED STATES PATENT OFFICE.

ALBERT A. CRYER, OF NEW YORK, N. Y., ASSIGNOR TO D. G. C. TRAP & VALVE CO., INC., A CORPORATION OF NEW YORK.

VALVE.

Application filed May 20, 1916. Serial No. 98,736.

*To all whom it may concern:*

Be it known that I, ALBERT A. CRYER, a citizen of the United States, and a resident of the city, county, and State of New York, have invented certain new and useful Improvements in Valves, of which the following is a specification.

This invention relates to an arrangement of valves to be used in connection with the flow of fluids, such as water, steam or gas, and other fluids, under pressure and high velocities, and is particularly useful in handling such fluids if they contain dirt or impurities of any character.

One object of the invention is to eliminate wear on the valve member and the seat of the main controlling valve by making provision for the easy operation of the valve member by substantially equalizing the pressure on both sides of the valve member during its operation in either opening or closing.

Another object is to provide simple means in such form as to provide a straight-way passage for the fluids being dealt with.

Another object is to avoid wire-drawing and abrasive action of fluids under pressure passing through the main valve.

One of the greatest difficulties in handling dirty fluids under pressure is that of abrasion and wearing of the main valve and its seat either as the fluid rushes through at high velocity, or as the valve is moved across its seat under pressure. The result of this, as valves have heretofore been constructed, is that after the valve has been operated a few times, scorings and markings are produced either on the valve member or its seat, or both, so that when the valve is closed it is not fluid-tight. Numerous constructions and arrangements have been tried, but so far as I am aware none of them have been reliable in commercial use.

The arrangement in accordance with my invention has been found after considerable use to be entirely reliable and so far has thoroughly fulfilled commercial conditions. I provide in the main passage a main valve which is to remain fluid-tight at all times except when open, and either on the inlet, or preferably on the outlet, side of the main valve a throttle valve is placed, which is not necessarily fluid-tight, but which is preferably nearly so. One of the functions of this throttle valve is to regulate the flow through the main valve after the latter has been completely opened.

Around the main valve is placed a bypass, one end of which communicates with the chamber between the throttle valve and one side of the main valve, and the other end of which communicates with the opposite side of the main valve. In any event, the bypass is around the valve member of the main valve. The main valve may be of any construction but is preferably so constructed that the inlet and outlet passages are in line with each other. Also the throttle valve may be of any suitable construction, but I have found the butterfly type of valve satisfactory, but the invention is not in any way to be limited to the type either of the main valve or the throttle valve.

The bypass may be of any suitable arrangement, but the one shown in the drawings, and hereinafter described, has been found to be highly satisfactory because of the compact and simple arrangement. The valve controlling the bypass may be of any suitable construction also.

A bypass has been used around a main valve in some instances heretofore, but in such cases one end of the bypass communicates with a piping system of great volume so that after the bypass is opened it takes many hours, and sometimes, days, for the pressure to equalize on the two sides of the main valve member. This difficulty has been overcome by the arrangement of my invention by reason of the fact that one end of the bypass opens into the chamber between the main valve and the throttle valve, which is of very small volume, and, in fact, may be considered negligible so that immediately upon the opening of the bypass the pressures are equalized on both sides of the main valve member so that the main valve may be easily and quickly opened without any pressure to cause the valve or its seat to be scored or mutilated in any manner by the presence of dirt or grit or other foreign matter. Since the main valve only is supposed to remain fluid-tight it does not matter if the throttle valve is subjected to wear or abrasion by reason of the fact that it is opened and closed under pressure.

From the foregoing, it will be evident that I have provided means whereby the main valve is not only protected at all times against such abrasion and wear as would cause leakage, but since it is opened and closed always with equal pressures on both sides of the main valve member, the same will be easily operated both in opening and closing, which, in commercial use, is a considerable factor, because there is no likelihood of the valve sticking, which, in many instances, means a complete shutting down of the power system until the pressure has been relieved and the valve taken out and repaired. This condition frequently happens in blow-off or steam boilers. It may, of course, happen in other uses also.

The embodiment of the invention shown in the drawings will be more fully understood by reference to the drawings taken in connection with the following description.

In the drawings,

Fig. 1 shows a section of the valve through the line 1—1 of Fig. 3;

Figure 1ª shows a boiler A, of any ordinary construction with a valve B attached thereto both of which are shown merely in outline.

Fig. 2 is a plan view with a part of the casing on the induction side removed;

Fig. 3 is a plan view of the completed device; and

Fig. 4 is a section on line 4—4 of Fig. 3, partly broken away, and showing an arrangement of the bypass and the valve controlling the same.

Referring to Fig. 1 the valve comprises a casing having parts 1 and 2 bolted together in the ordinary manner by bolts 3. A gasket 4 is placed between the two parts of the casing for the purpose of maintaining them fluid-tight in the usual manner. The casing is so arranged that between the two parts a chamber is provided and in this chamber is placed the valve members and mechanism for operating the same. These devices comprise a valve member 5 in the form of a disc with a boss 6 thereon, and a similar disc 7 also having a boss 8 thereon, the bosses on the two discs being placed adjacent each other. A spring 9 is interposed between the two discs 5 and 7. This spring may be of any well-known type, arranged in the form of a coil or otherwise. The disc 5 bears upon the valve seat 10 and the disc 7 bears upon a seat 11 similar to the seat 10. The discs 5 and 7 are moved by means of an arm 12 preferably rigidly fixed to a spindle 13 which may be operated with any suitable operating means. The spindle 13 passes through the usual stuffing-box 14 in the part 2 of the casing and is provided with a flange 15 bearing on the inside of the part 2 to form an extended bearing surface. The spindle 13 is also journaled at 16 in the part 1 of the casing. The arm 12 is provided in its outer end with an opening and passes around the bosses 6 and 8 of the discs 5 and 7. The opening in the arm 12 is somewhat larger than the bosses thereby forming a loose connection permitting of self-adjustment of the discs. The part 2 of the casing is provided with guides 17 and 18 which are on a level with the valve seat 10 so that the valve member, when it is moved around off its seat, will be maintained at the proper level to be again moved back on the seat. This construction is shown in Fig. 2.

The part 1 of the casing is made to correspond in exact detail with this construction of the part 2, and the disc 7 operates in conjunction with the part 1 in the exact manner in which the disc 5 does with the part 2. By this arrangement the two discs move in parallel planes and are maintained in constant pressure with their seats or their guides by means of the spring 9. The arrangement of independent discs and a loose connection with the arm 12 permits of a cheap construction in that it is not necessary that the arm 12 move in a plane exactly parallel with the valve seats. Consequently a slight variation in the machining or in the fitting of the stuffing-box or journaling of the spindle 13 does not seriously affect the adjustment of the valve, because the loose connection of the arm 12 with the discs permits of self-adjustment which overcomes any such inaccuracies of construction.

The device, as shown in Fig. 1, is provided with a second valve 19 which is shown in the present instance as a valve of the butterfly type. This valve member 19 is mounted on a spindle 20 journaled in part 2 of the casing. This spindle 20 may be provided with any suitable operating means for opening and closing the butterfly valve. Other forms of valve may be used with satisfaction, but I have found that the butterfly type lends itself in a peculiar manner to the construction set forth herein.

The device is provided with induction and eduction passages, but the similarity of the discs 5, 6 and their co-operating seats and guides makes the device entirely interchangeable, and consequently, each of the passages 21 and 22 may be considered as induction or eduction ports, depending upon which way the device is connected. The device will satisfactorily operate when connected either way, but I prefer to make the passage 22 the induction and the passage 21 the eduction. These two passages are threaded or flanged in their outer portions so that they may be readily connected onto a piping system in the well-known manner.

Arranged around the main valve member comprising the discs 5 and 7 and the operating arm 12 is a bypass 23. This bypass communicates with the chamber in which the main valve member is placed and also communicates with the chamber between the valve member 19 and the main valve member, as shown at 24 in Fig. 1. This bypass is controlled by a valve 25 having the usual stuffing-box 26 and spindle 27 shown in Fig. 4. It will be noted that this bypass is formed in part 2 of the casing of the valve, which arrangement makes this device self-contained and simple in construction and devoid of parts which are liable to be injured from external sources. It will be noted also that when the main valve member is in its open position it covers the bypass by resting upon a bypass seat 28. The guide 18 being across the passage of the valve member acts to clean the same of any dirt or grit which it contains, the grit or dirt being pressed out into the bottom of the valve casing on either side of the guide 18. This has a distinct advantage over the solid guide of the same size as the valve seat, because in that case the presence of grit or dirt on the valve member would cause a scoring or marking of the valve member, since the foreign matter would have no point of escape during the operation of the valve.

By reference to Fig. 4 it will be seen that the spindle 13 controlling the main valve member has connected on its outer end a section 32 of gear having gear teeth thereon. An operating handle 29 is provided and is journaled on a short shaft 30 which may be a lug cast on the part 2 of the valve casing. Rigidly attached to this operating arm is a section 31 of gear also having teeth on a part of its periphery. The operating spindle of the bypass valve is provided with a complete gear wheel 33. The gear teeth on the sector 31 are arranged to match with the teeth on the gear 33 and the section 32. There is a blank portion also on the sector 31, the function of which is to permit a certain movement of the arm 29 before a movement of the section 32. The object of this arrangement is to guarantee that the bypass will be opened before the main valve can be opened.

From this construction it will be seen that it is impossible to operate the main valve to open it without first opening the bypass, and likewise it is impossible to close the bypass until after the main valve has been closed. This arrangement avoids any possibility of the operating of the main valve while there is a difference of pressure on its two sides.

It will be noted that the teeth on the gear-wheel and the corresponding ones on the sector 31 are of such length that they will remain in contact notwithstanding the in-and-out movement of the gear 33 during the closing and opening of the bypass valve.

The throttle valve shaft 20 is provided with a worm-gear 34. A spindle 35 is also provided and has a wheel 36 for operating the same. This spindle 35 is journaled in two lugs 37 cast on the main valve casing. This spindle is provided with a worm 38 arranged to engage the worm gear 34 to operate the throttle valve 19. The worm-gear and spindle are provided for the purpose of preventing a rapid closing of the valve, and also as providing means for holding the throttle valve in any desired position.

The operation of the device is as follows:

Assuming that the device is connected in a piping system handling fluids of high pressure and that the same is closed and it is desired to open it, the handle 29 is moved to the right and the teeth of sector 31 come in engagement with the gear 33 and open the bypass valve 25 which equalizes the pressures on the two sides of the main valve member. As the handle 29 is further moved the teeth of the sector 31 come in engagement with the teeth on section 32 and the main valve members will be swung open by means of the spindle 13. The relief of the pressure renders the opening of the main valve easy of accomplishment and the absence of difference of pressure on the sides of the valve eliminates the liability of marking or otherwise mutilating the valve seat or the disc 5 or 7, as the case may be. The throttle valve 19 is then opened by turning the wheel 36 and the flow of fluid through the main valve regulated by the valve 19. One of the advantages of the butterfly type of valve is that the pressure on the two wings of the valve almost equalize each other and this valve, notwithstanding the presence of difference of pressure on induction and eduction sides, is easily operated.

When it is desired to close the device the operation is the exact reverse of the opening and consists in first closing the throttle valve 19, then moving the handle 29 to the left, closing the main valve and the bypass in the order named.

It is not essential that the throttle valve be fluid-tight, because one of the main functions of this valve, when closed, is to render possible a rapid equalization of pressures on the sides of the main valve by the bypass by limiting the volume of flow through the bypass.

From the above description it will be apparent that I have provided a simple and compact arrangement which is easily operated and in which the main valve member is always operated without difference of pressure on its two sides, thus insuring long life and efficient operation by avoiding wire-drawing and abrasion. The easy operation of the device is of considerable value because in valves as heretofore constructed the opening and closing of the valve was not only a difficult physical task, but the operators of this class of device realized that if the valve was opened under pressure and closed again it would probably not be tight and consequently would be leaky, which would necessitate shutting down of the boiler, if it was used as a blow-off, which entailed a considerable amount of labor and delay and annoyance in other respects.

While I have shown the device as at present preferred by me, nevertheless my invention is not, in any manner, limited to the exact construction of any of the parts, but resides in the combination of elements as hereinafter set forth in the claims.

Having described my invention, what I claim as new and desire to secure by Letters Patent is:

1. In a device for controlling the flow of fluids under high pressure, the combination of an inlet adapted to be connected to a source of high pressure, and an outlet, a valve member separating said inlet and outlet, and adapted to withstand normally high pressure existing on opposite sides thereof, a valve in the outlet passage, means for equalizing the pressure on opposite sides of said valve member and means for opening said valve member while the pressure is thus relieved thereby to prevent scoring the seat of the valve member.

2. The combination of a steam boiler, a blow-off valve connected thereto comprising an inlet and an outlet, a valve member separating said inlet and outlet and adapted to withstand the normal boiler pressure on opposite sides thereof, a valve in said outlet and means for equalizing the pressure on the sides of said member.

3. The combination of a source of fluid under pressure containing solid matter, a valve connected with said source comprising an inlet and an outlet, a movable member separating said inlet and outlet and adapted to withstand the normal pressure of the source, a valve in the outlet, a passage connected to the valve on the outlet side of the movable member to equalize the pressure on the sides of said member and means for moving said member while the pressure is equalized and means for operating the valve in the outlet.

4. The combination of a source of fluid under pressure, a blow-off valve therefor comprising an inlet connected to said source and an outlet, a valve member between the inlet and outlet and capable of withstanding the pressure of the source, a seat for the member, a valve in the outlet, a passage adapted to connect the two sides of the valve member together, a valve in said passage and means operating said valves.

5. In a device of the character described, the combination of a two-part casing, a chamber between said parts and an induction port in one part and an eduction port in the other part, a valve in said chamber and normally covering one of said ports, a passage leading from said chamber to the eduction passage and a valve in the eduction passage beyond the point where said first passage opens into the eduction passage.

6. In a device of the character described, the combination of a two-part casing, a chamber between said parts and an induction port in one part and an eduction port in the other part, a slidable valve in said chamber and normally covering one of said ports, a passage leading from said chamber to the passage from said eduction part, a valve in said first passage and a valve in the eduction side beyond the point where said first passage opens into the eduction side of said valve.

7. In a blow-off valve for steam boilers, the combination of an inlet adapted to be connected to a boiler and an outlet, a valve member with its seat between said inlet and outlet and adapted to withstand boiler pressure, a valve in the outlet and a by-pass around the member for equalizing the pressure on the sides of said member so that the same may be opened without difference of pressure on its sides thereby to prevent damage to the member and seat.

8. In a device of the character described, the combination of a main valve, a second valve, a bypass around said main valve, means for opening and closing said bypass and means for opening and closing said main valve, said opening and closing of the main valve being dependent, respectively, upon the prior opening and later closing of said bypass.

9. In a device of the character described, the combination of a main valve, a throttle valve, a bypass around the main valve and means preventing the opening of the main valve until after the bypass has been opened.

10. In a device of the character described, the combination of a main valve, a throttle valve, a bypass around the main valve and means preventing the closure of the bypass before the closure of the main valve.

11. In a device of the character described, the combination of a main valve comprising a two-part casing, each having a valve seat and guides similar to the other, two discs, each co-operating with one of said seats and guides, an arm for operating both of said discs and having a loose connection with said discs, a second valve and bypass around said main valve member.

12. In a device of the character described, the combination of a main valve comprising a two-part casing, each part having a valve seat and guides, a valve disc for co-operating with each seat and guides, a spring between said discs for holding same against their respective seats, means for moving said discs and being loosely connected therewith to permit of independent self-adjustment of said discs, a second valve and a by-pass in one part of said casing for equalizing the pressure on the sides of said main valve.

13. A blow-off valve for steam boilers comprising an inlet and an outlet, a main valve member separating said inlet and outlet and adapted to withstand the normal boiler pressure on opposite sides thereof, a secondary valve member in said outlet, and means for equalizing the pressure on the sides of said main valve member.

14. A blow-off valve for steam boilers comprising an inlet and outlet, a main valve member separating said inlet and outlet and adapted to withstand the normal boiler pressure thereon, a secondary valve member on one side of said main valve member and means for equalizing the pressure on the opposite sides of said main valve member.

15. In a blow-off system for steam boilers and the like the combination of a main valve member adapted to withstand the normal boiler pressure thereon and to maintain a tight closure, a secondary valve member disposed on one side of the main valve member, a chamber between said valve members and a controlled by-pass around the main valve member for equalizing the pressure on the opposite sides of the main valve member.

16. In a device of the character described, the combination of a two-part casing forming a chamber between said parts and having an induction port in one part and an eduction port and an eduction passage in the other part, a slidable valve in said chamber and normally covering one of said ports, a controlled passage being provided leading from said chamber to the eduction passage, and a valve in the eduction passage beyond the point where said controlled passage opens into the eduction passage.

17. In a device of the character described, the combination of a two-part casing forming a chamber between said parts and having an induction port in one part and an eduction port and an eduction passage in the other part, a slidable valve in said chamber and normally covering one of said ports, a by-pass passage being provided leading from said chamber to the passage from said eduction port, a valve in control of said by-pass passage, and a valve in the eduction passage beyond the point where said by-pass passage opens into the eduction passage of said valve casing.

18. In a device of the character described, the combination of a two-part casing, each part having a valve seat and guides, a main valve comprising a valve disc for co-operating with each seat and guides, a spring between said discs for holding them against their respective seats, means for moving said discs loosely connected therewith to permit of independent self adjustment of said discs, and a second valve, a controlled by-pass being provided in one part of said casing for equalizing the pressure at the opposite sides of said main valve.

19. In a device of the character described, the combination of a casing having two similar valve seats and guides extending laterally therefrom and in substantially parallel planes, a main valve comprising two similar valve discs, one for each seat, a spring for normally holding said discs on their seats, an arm for operating said valve discs and having a loose connection therewith, whereby the ends of said device may be used interchangeably for induction or eduction and said discs are independently self-adjusting, and a second valve, a controlled by-pass being provided in said casing for equalizing the pressure at the opposite sides of said main valve.

20. A valve device comprising a valve casing having ports in line and having two similar valve seats for the ports, two similar valve discs, one for each seat and port, a by-pass being provided around both of the valve seats and valve discs, a valve in control of the by-pass, and a throttle valve arranged in tandem with the valve discs beyond one of the ends of the by-pass, whereby either end of the device may be made the induction end.

In testimony whereof, I have signed my name to this specification.

ALBERT A. CRYER.